United States Patent [19]

Hanna

[11] 4,023,228
[45] May 17, 1977

[54] WHEEL CLEANER

[76] Inventor: Daniel C. Hanna, 1133 SW. Rivington Drive, Portland, Oreg. 97201

[22] Filed: June 18, 1975

[21] Appl. No.: 588,013

[52] U.S. Cl. .............................. 15/53 B; 15/DIG. 2
[51] Int. Cl.² .......................................... B60S 3/04
[58] Field of Search ...................... 15/DIG. 2, 53 B

[56] References Cited

UNITED STATES PATENTS

| | | | |
|---|---|---|---|
| 2,829,534 | 3/1959 | Swanson et al. | 15/179 |
| 2,837,759 | 6/1958 | Haverberg | 15/53 B |
| 3,346,895 | 10/1967 | Consolo | 15/53 B |

Primary Examiner—Edward L. Roberts
Attorney, Agent, or Firm—Klarquist, Sparkman, Campbell, Leigh, Hall & Whinston

[57] ABSTRACT

A cleaning solution is wiped onto a sidewall of a tire by two straight brushes engaging the sidewall and the brushes confine the solution therebetween and spread it over the side of the tires. The solution is fed from a low gravity head, and a pulse of compressed air is introduced to give a short, measured feed of the solution to the tire.

4 Claims, 6 Drawing Figures

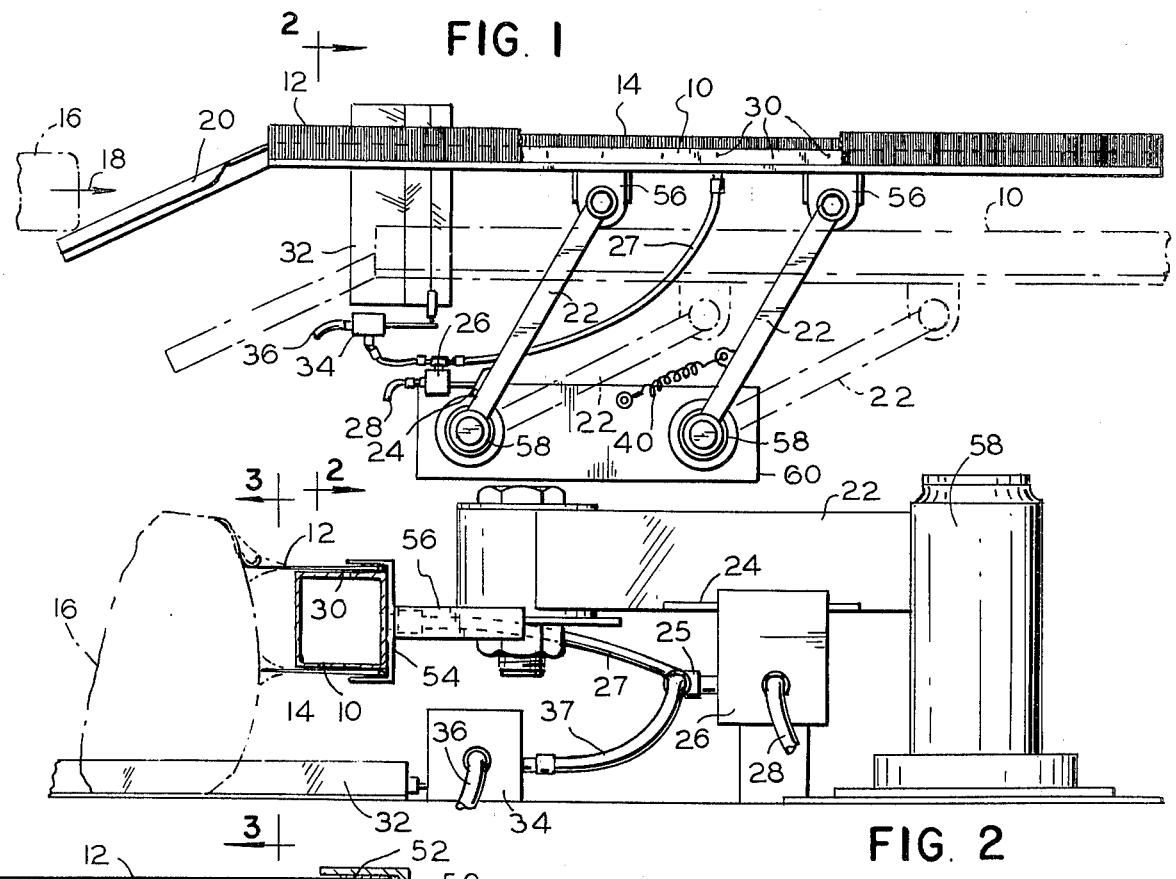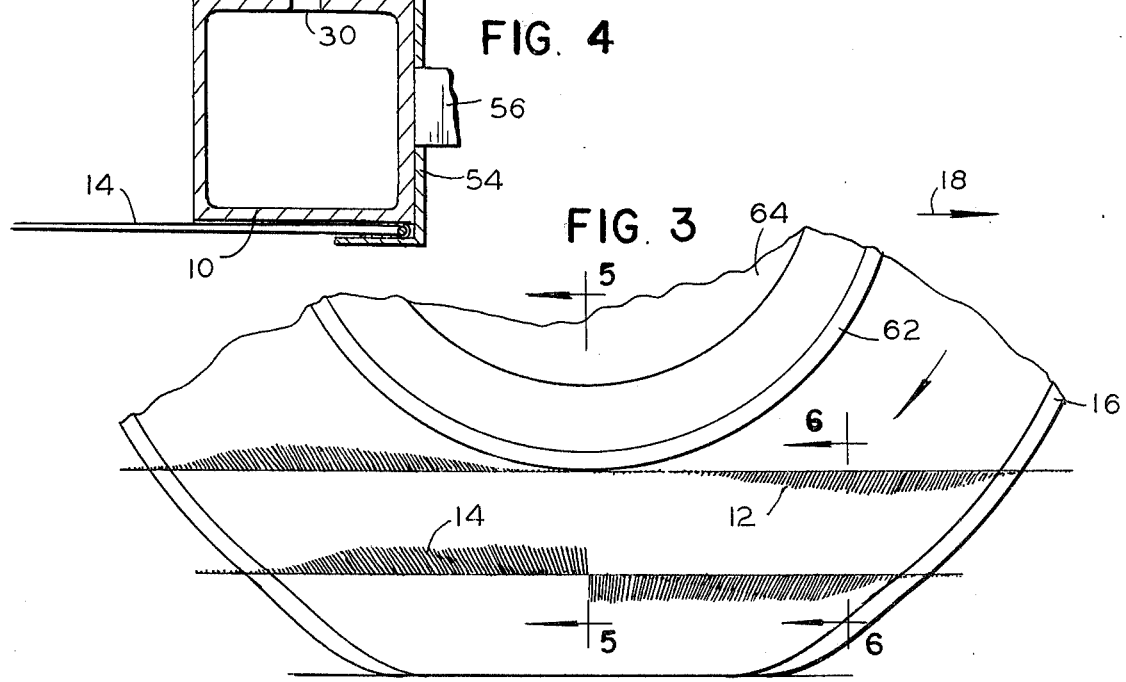

WHEEL CLEANER

Description

This invention relates to an improved wheel cleaner, and has for an object thereof the provision of a wheel cleaner adapted to apply a thin uniform coat of a strong cleaning solution to a side of a tire.

Another object of the invention is to provide a wheel cleaner having two spaced, confining applicator rows wipe a side of a tire rolled therealong to spread on the side of the tire a cleaning solution.

A further object of the invention is to provide a wheel cleaner wherein a pulse of high pressure air is applied to a cleaning solution being supplied to a row of spreading bristles engaging a side of a tire.

In the drawings:

FIG. 1 is a top plan view of an improved wheel cleaner forming one embodiment of the invention, FIG. 2 is an enlarged, vertical sectional view taken along line 2—2 of FIG. 1;

FIG. 3 is an enlarged vertical sectional view taken along line 3—3 of FIG. 2;

FIG. 4 is an enlarged vertical sectional view taken along line 4—4 of FIG. 1;

Figure 5:
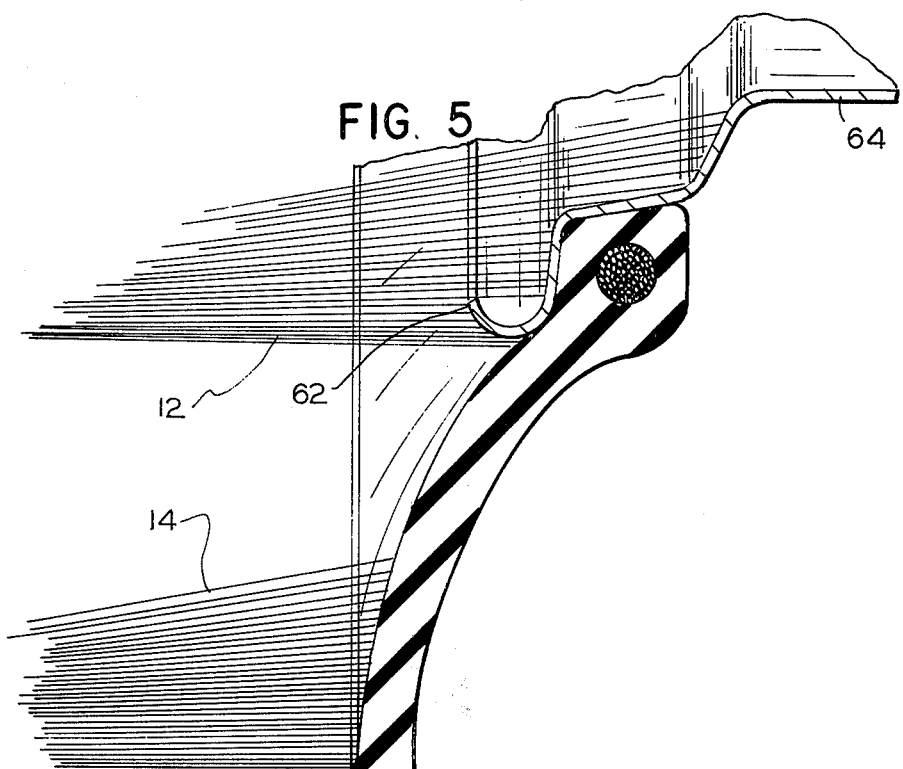
FIG. 5 is an enlarged vertical sectional view taken along line 5—5 of FIG. 3; and, FIG. 6 is an enlarged vertical sectional view taken along line 6—6 of FIG. 3.

Referring now in detail to the drawings, there is shown therein an improved wheel cleaner forming one embodiment of the invention and including a nozzle tube 10 closed at its ends, and urging two straight, parallel applicators 12 and 14 endwise or edgewise against a side of a tire 16 rolled continuously along a wheel path or track 18 of a car wash. The applicators 12 and 14 in the disclosed embodiment are two rows of elongated, stiff nylon bristles. The tire engages an entrance deflector 20 rigid with the tube 10 and pushed the nozzle tube 10 to one side of the tire with only the ends of the bristles engaging the tire. The nozzle tube swings on parallel arms 22, and a cam 24 on one of the arms opens a valve 26 in a supply line 28 from a supply of a strong cleaning solution, which may be in a caustic solution. A T-coupling 25 connects the valve 26 to a flexible hose 27 connected to the tube 10. The supply of the solution (not shown) under atmospheric pressure is elevated a few feet above the lower end portion of the line 28 to apply a low, gravity pressure to the solution, and the solution is forced under this low pressure out of outwardly opening nozzle slots 30 in the nozzle tube, and spaced closely therealong, preferably being spaced about two or three inches apart along the entire length of the tube. Just as the tire is engaged by the bristles completely across the lower portion thereof, the tire momentarily actuates a treadle 32 to momentarily open a valve 34 in a compressed air line 36 to supply a pulse or burst of compressed air to the line 28 to spurt the cleaning solution out of the nozzle slots onto the upper bristles. The valve 36 is connected to the T-coupling 25 by a hose 37. The solution spreads over the upper row of bristles and flows down the outside of the tube onto the lower row of bristles. Some of the solution flows along the bristles of the lower row to their tips and to the sidewall of the tire. The bristles spread the cleaning solution evenly on the side of the tire as the tire is rolled along the bristles. Farther along the track, soapy water is sprayed onto the car and tire, and the wetter outer side of the tire is brushed and then rinsed with plain water.

As best shown in FIG. 1, the rows of bristles are urged against the side of the tire by a spring 40 with just sufficient force that the bristles are flexed only slightly but sufficiently to conform to the side of the tire along the chords along which the tip ends of the bristle are position. The bristles of each row are sufficiently close to each other, and each row is of two-bristle thickness so that the rows of bristles minimize leakage of the solution therepast. That is, the bristles of the rows confine the solution to the space between the two rows to a large extent.

Each row 12 and 14 of the bristles is of a length sufficient to engage the tire during substantially more than one revolution of the tire after the spurt of the solution. Also, this spurt is timed to occur just after the tire rolls into full engagement with the rows of bristles. That is, the tire is advanced to a position in which the rows extend completely across the chords of the tire when the solution is pulsed. The bristles apply a thin uniform coating of the solution to the sidewall of the tire and simultaneously dislodge any particles of dirt and debris that might have been stuck to the tire.

Figure 6:
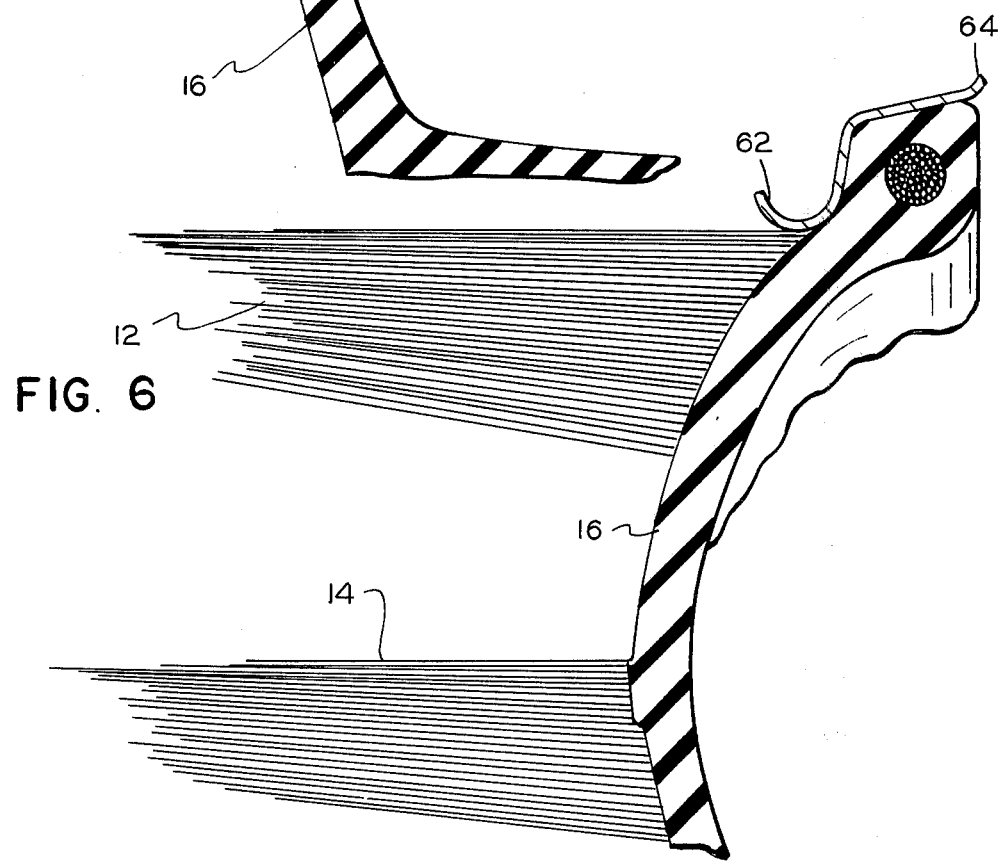

The brushed are composed of double back or U-shaped bristles in side-by-side positions and retained by wires 50 and channel-like holders 52 clamped against the tube 10 by a U-shaped frame 54. Thus, each row of bristles is two bristles thick. Brackets 56 connect the frame pivotally to the arms 22 which are pivotally mounted on posts 58 held in fixed positions on base plate 60. The bristles are sufficiently stiff and the urging thereof toward the tire by the spring 40 is such that only the ends of the bristles engage the tire and the bristles are sufficiently flexible and the urging force is such that the ends of all the bristles chordally spanning the tire engage the tire. As best shown in FIGS. 5 and 6, the bristles project into the space between rim 62 of wheel 64, and the tire 16 to spread the solution over the entire radially inwardly positioned, exposed portion of the sidewall. The ends of the bristles also engage the radially outwardly positioned portions of the sidewall. Thus, the bristles spread the solution over the entire sidewall.

What is claimed is:

1. In a wheel cleaner,
   a plurality of flexible applicators comprising flexible bristles sufficiently stiff that only the ends of the bristles engage a sidewall of a tire when pressed endwise against the sidewall,
   non-rotating means mounting the bristles in substantially horizontal parallel, vertically spaced rows,
   means urging the holding means toward the sidewall of the tire to press the ends of the bristles into engagement with the sidewall and extending across chords of the sidewall,
   and means for flowing a cleaning liquid along the bristles to the ends thereof so that the bristles wipe the sidewall and spread the cleaning liquid thereover as the tire is rotated,
   the holding means and flowing means comprising a horizontal tubular conduit having discharge openings therein and supplied with the cleaning liquid, the bristles of one row being positioned above the conduit and receiving liquid therefrom.

2. The wheel cleaner of claim 1 wherein the flowing means includes supply means supplying the cleaning liquid under a low pressure to the conduit, and means for momentarily increasing the pressure on the liquid in the conduit.

3. The wheel cleaner of claim 1 wherein the upper row of bristles covers the openings in the conduit.

4. In a wheel cleaner,
- a plurality of flexible applicators comprising flexible bristles sufficiently stiff that only the ends of the bristles engage a sidewall of a tire when pressed endwise against the sidewall,
- non-rotating holding means mounting the bristles in substantially horizontal parallel, vertically spaced rows,
- means urging the holding means toward the sidewall of the tire to press the ends of the bristles into engagement with the sidewall and extending across chords of the sidewall,
- and means for flowing a cleaning liquid along the bristles to the ends thereof so that the bristles wipe the sidewall and spread the cleaning liquid thereover as the tire is rotated,
- the holding means and the flowing means including a horizontal tubular conduit carrying the bristles and having openings in the upper portion thereof for flowing liquid onto the upper row of bristles.

* * * * *

UNITED STATES PATENT OFFICE
CERTIFICATE OF CORRECTION

Patent No. 4,023,228            Dated May 17, 1977

Inventor(s)            DANIEL C. HANNA

It is certified that error appears in the above-identified patent and that said Letters Patent are hereby corrected as shown below:

Col. 1, line 39, change "pushed" to --pushes--

Col. 1, line 51, change "outwardly" to --upwardly--

Col. 2, line 1, change "wetter" to --wetted--

Col. 2, line 25, change "brushed" to --brushes

Claim 1, line 6, after "non-rotating" insert --holding--

Claim 1, line 16, before "flowing" insert --the--

Signed and Sealed this thirtieth Day of August 1977

[SEAL]

Attest:

RUTH C. MASON
*Attesting Officer*

C. MARSHALL DANN
*Commissioner of Patents and Trademarks*